May 21, 1968 C. J. A. VOLZ 3,384,451
PRODUCTION OF SPHERICAL GRANULES OF ALKALI
EARTH PHOSPHATE SALTS
Filed Oct. 22, 1965
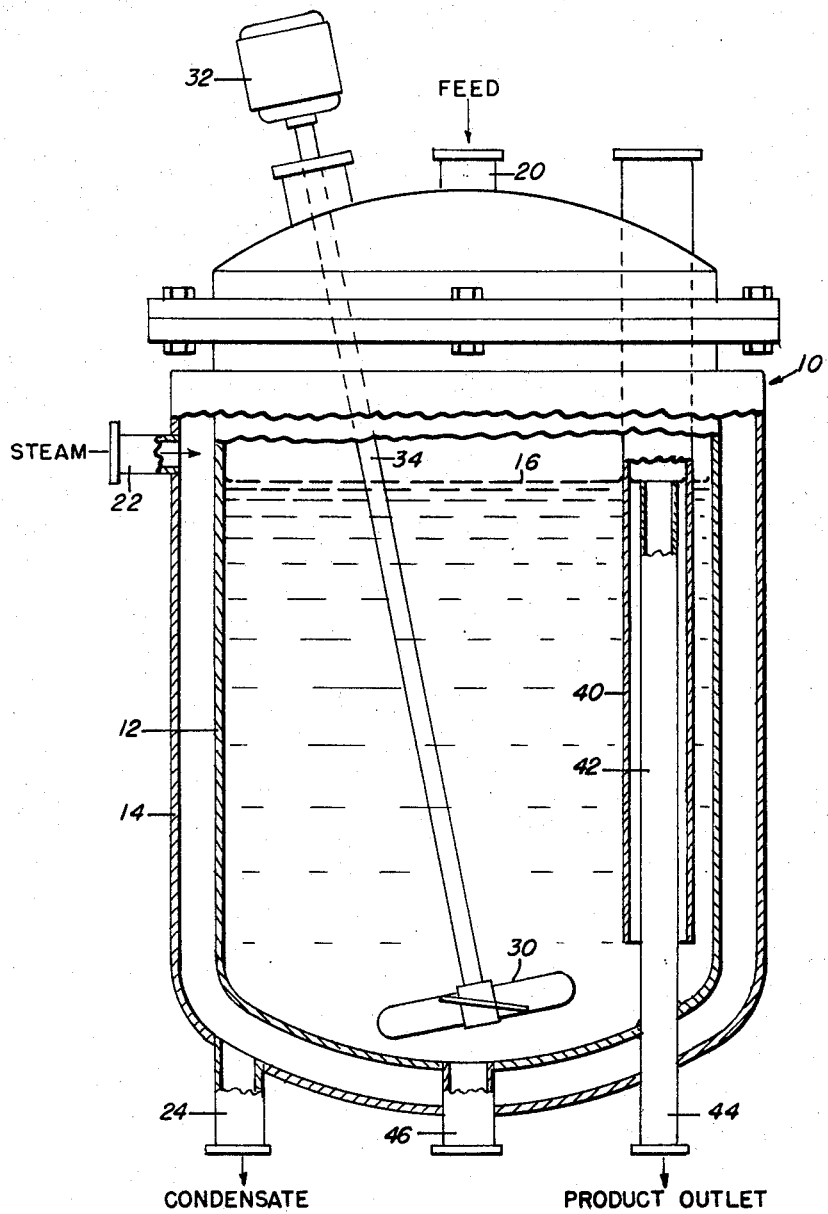
INVENTOR
CHARLES J. A. VOLZ
BY 3,384,451
PRODUCTION OF SPHERICAL GRANULES OF ALKALI EARTH PHOSPHATE SALTS
Charles J. A. Volz, Riviera Beach, Md., assignor, by direct and mesne assignments, of one-half to W. R. Grace & Co., Clarksville, Md., and one-half to the United States of America as represented by the Secretary of the Interior
Filed Oct. 22, 1965, Ser. No. 502,700
4 Claims. (Cl. 23—105)

ABSTRACT OF THE DISCLOSURE

A method for producing dehydrated particles of alkali earth phosphate salts having substantially spherical configurations comprising heating a water slurry of said salts to dehydration temperature and agitating the slurry during dehydration.

---

This invention relates to a process for granulating phosphate salts by dehydration. In particular the novel process sets forth a technique for agitating and heating a water slurry containing hydrates of alkali earth metal phosphates to drive off all or a portion of the water of hydration during heating to produce granules of the phosphate salts which have a spherical shape. These granules are more easily handled as a slurry using conventional hydraulic operations.

Phosphate salts derived as by-products from the treatment of sea water have substantial use as fertilizers. Such salts as magnesium ammonium phosphate hexahydrate and dibasic calcium phosphate dihydrate are typical by-products from the precipitation methods used for removing undesirable calcium and magnesium ions from sea water feed stocks for desalination processes. These by-products contain useful alkali earth metals, nitrogen, and phosphorus, which have great utility as fertilizers for plant life. However, in the highly-hydrated form in which these salts are recovered they are difficult to handle because of the particle size and configurations. Also, the particles contain additional weight in the form of water of hydration, which has no nutritional value.

Accordingly, it is an object of this invention to provide a process for producing solid particles of phosphate salts having a low hydration content and such configuration as to provide easy handling, especially by hydraulic methods. It is a further object of this invention to set forth a method for dehydrating alkali earth metal phosphate salts by heating the salts in a water slurry during agitation to drive off water of hydration from the solid particles and to produce granules having a substantially spherical shape. These and other objects and features of the invention will be seen more clearly in the description following and in the appended drawing in which the single figure is a vertical view of the reactor partially cut away.

It has been discovered that certain phosphate salts that are generally insoluble or only slightly soluble in water may be granulated by a new process. These compounds are characterized by their property of dehydration during heating, even in the presence of a water slurry. Typical of these salts are magnesium ammonium phosphate hexahydrate ($MgNH_4PO_4 \cdot 6H_2O$) which may be converted to its monohydrate form ($MgNH_4PO_4 \cdot H_2O$) and dibasic calcium phosphate (dicalcium orthophosphate) dihydrate ($CaHPO_4 \cdot 2H_2O$) which may be converted to its anhydrous form. Both the higher and lower hydrate forms of these salts are essentially insoluble in water.

The production of these alkali earth metal phosphates as a by-product of sea water feed stock-pre-treatment for desalination units results in a higher hydrate form of the salts in random-shaped particles that are difficult to handle. By the instant process a highly-desirable product is obtained by a simple thermal treatment during which a slurry containing single salts, or mixtures of salts, is heated to a temperature at which water of hydration is separated from its corresponding salt structure. If such dehydration is carried out under conditions of agitation the resulting particles take on a generally round shape and a controlled size. Particle size is dependent on the characteristics of the input material to the process, and on heating rates, agitation, and residence time. The process may be operated in a continuous stream or batch-wise, as in the example given.

Referring to the drawing, a reactor 10 is shown having an inner vessel 12, which is surrounded by a steam jacket 14. A slurry 16 is fed to the reactor 10 through an inlet conduit 20. Heating of the reactor is effected by introducing steam to the jacket 14 through an inlet pipe 22. Steam condensate is removed from the bottom of jacket 14 through condensate drain 24. Agitation of the slurry during reaction is provided by an impeller 30, operatively connected to a drive motor 32 by drive shaft 34. Product granules in slurry are removed from reactor 10 by hydraulically conveying the particles through vertical conduit 40 to the top of a standpipe, 42, which functions to maintain liquid level in the reactor. Overflow product is taken from the reactor by conduit 44 conduit 44 situated at the bottom of reactor 10. Reactor drain conduit 46 provides a means for emptying the reactor 10.

EXAMPLE

A slurry was made by mixing 17.7 parts by weight of magnesium ammonium phosphate hexahydrate, 2.3 parts of dibasic calcium phosphate dihydrate, and 80 parts of water. Solid particles in the slurry had a size of less than 44 microns. The ratio of calcium to magnesium was 0.309:1, about the same as found in raw sea water. The resulting slurry contained 15 to 25 w/o solids and had a pH of 8.2. From a starting temperature of 80° F. the slurry was heated to a temperature of 210° F. in an agitated jacketed reaction vessel during a residence time of about one hour. The reactor was 30 inches in diameter had a straight wall 42 inches high with a dished bottom and had a 4-inch pipe baffle. The agitation was a 3-blade, 10-inch marine type impeller operated at 350 r.p.m. Solid spherical granules were formed having a size range that passed through a U.S. Standard No. 20 sieve onto a No. 30 mesh size screen. A reactor overflow stream carrying the granules and other fine particles had a pH of 7.9. The product was dewatered on a rotary drum filter to less than 20 weight percent (w/o) moisture. The solids were washed free of fine particles to produce spherical granules consisting essentially of magnesium ammonium phosphate monohydrate, which were easily slurried and transferred by ordinary hydraulic methods. An analysis of the particles gave the following results, expressed in weight percent:

| Component: | Amount |
|---|---|
| Moisture (at 100° C.) | 0.42 |
| N (total) | 8.00 |
| Water-soluble N | 0.05 |
| $P_2O_5$ (total) | 45.20 |
| Insoluble $P_2O_5$ | 4.08 |
| MgO | 23.39 |
| CaO | 5.31 |

The granule product of the above example can be used as a non-burning and slow-release nutrient for many agronomic applications.

Reaction temperature for the above example can be varied considerably. With the reactor vessel under pressure, the temperature of the slurry can be raised to 250°

C. and a shorter residence time realized. Temperatures as low as 95° F. may be employed for granulation under some conditions. Product particle size will depend upon reaction conditions, and a mesh range of about 6 to 35 mesh can be obtained. Larger particles result from increasing slurry concentration and controlling agitation.

The principal advantage of the slurry agitation dehydration process over other known processes is the preparation of easily handled material in a slurry tank using efficient steam heat rather than a rotary dryer with its high heat losses and some product loss. A better product is obtained when prepared by the new process, since nitrogen and phosphate contents of the fertilizer are found to be higher in the slurry-formed granules.

Concentration of solids in the slurry feed stock, the dehydration temperatures employed, or the pH of the slurry do not appear to be critical factors in the process. Neither does the amount of agitation, so long as it is sufficient to produce the desired particle size and configuration. Various methods for heating the slurry may be employed, such as electrical heating, indirect steam heat, or steam injection into the reactor vessel.

The invention has been illustrated by a specific example but there is no intent to limit the invention to the specific details so disclosed in the description, except insofar as set out in the following claims.

What is claimed is:

1. A method for producing solid particles of a member selected from the group consisting of calcium and magnesium phosphate salts having susbtantially spherical configurations and generally insoluble or only slightly soluble in water comprising heating a water slurry of a member of said group of phosphate salts having a high degree of water content to dehydration temperature, agitating the slurry at dehydration temperatures to lower the water content of said salts and to form therefrom solid particles having substantially spherical configurations and separating the dehydrated particles from the slurry.

2. The method of claim 1 wherein said dehydrated particles have a granule size in the range of about 20 to 30 U.S. Standard mesh.

3. The method of claim 1 wherein granules consisting essentially of magnesium ammonium phosphate monohydrate are obtained from magnesium ammonium phosphate hexahydrate by heating the hexahydrate in a water slurry to a temperature of about 210° F.

4. The method of claim 1 wherein a water slurry comprising 15 to 25 weight percent of magnesium ammonium phosphate hexahydrate and dibasic calcium phosphate dihydrate is heated to a temperature of about 210° F. during a residence time of about one hour in a heated reaction vessel agitated by an impeller at about 350 r.p.m.

References Cited

Van Wazer, "Phosphorus and Its Compounds," vol. 1, Chemistry, Interscience Publishers, Inc., New York, N.Y., 1958 (pp. 522, 540–542).

OSCAR R. VERTIZ, *Primary Examiner.*

L. A. MARSH, *Assistant Examiner.*